(12) United States Patent
Mehandjiysky et al.

(10) Patent No.: US 11,409,330 B2
(45) Date of Patent: Aug. 9, 2022

(54) RECEPTACLES FOR ELECTRONIC DEVICES

(71) Applicant: Hewlett-Packard Development Company, L.P., Spring, TX (US)

(72) Inventors: Dimitre D. Mehandjiysky, Spring, TX (US); Busarin Chumnong, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/978,729

(22) PCT Filed: Jul. 3, 2018

(86) PCT No.: PCT/US2018/040807
§ 371 (c)(1),
(2) Date: Sep. 7, 2020

(87) PCT Pub. No.: WO2020/009698
PCT Pub. Date: Jan. 9, 2020

(65) Prior Publication Data
US 2021/0325933 A1    Oct. 21, 2021

(51) Int. Cl.
*G06F 1/16* (2006.01)
*G06F 1/26* (2006.01)
(Continued)

(52) U.S. Cl.
CPC .......... *G06F 1/1656* (2013.01); *G06F 1/1652* (2013.01); *G06F 1/1669* (2013.01);
(Continued)

(58) Field of Classification Search
CPC .... G06F 1/1656; G06F 1/1652; G06F 1/1669; G06F 1/266; G06F 1/3271; G06F 1/3215; H02J 50/10
See application file for complete search history.

(56) References Cited

U.S. PATENT DOCUMENTS 6,476,795 B1   11/2002 Derocher et al.
7,210,046 B2 *  4/2007 Truong ............... G06F 3/03545
                                          713/323
(Continued)

FOREIGN PATENT DOCUMENTS

CN        202422005 U    9/2012
CN        103513710 A    1/2014
(Continued)

*Primary Examiner* — Rockshana D Chowdhury
(74) *Attorney, Agent, or Firm* — Conley Rose P.C.

(57) ABSTRACT

An example electronic device that includes a computing device further including a display and a housing. The housing has a front side and a back side, and the display is disposed on the front side. In addition, the electronic device includes a receptacle disposed on the back side of the housing. The receptacle is to receive an accessory device. Further, the electronic device includes a sensor in the receptacle to communicate with the computing device. The sensor to sense the presence of the accessory device within the receptacle. In response to the sensor sensing the presence of the accessory device within the receptacle, the computing device is to change a power state of the accessory device.

12 Claims, 8 Drawing Sheets

(51) Int. Cl.
  *G06F 1/3234* (2019.01)
  *H02J 50/10* (2016.01)
(52) U.S. Cl.
  CPC ............ *G06F 1/266* (2013.01); *G06F 1/3271* (2013.01); *H02J 50/10* (2016.02)

(56) References Cited

U.S. PATENT DOCUMENTS

| | | | |
|---|---|---|---|
| 9,857,846 B2 | 1/2018 | Lockwood | |
| 11,167,478 B2* | 11/2021 | Abbott, Jr. | ............... C03B 19/06 |
| 2002/0068487 A1* | 6/2002 | Chang | .................... H01R 27/02 |
| | | | 439/638 |
| 2005/0166076 A1 | 7/2005 | Truong | |
| 2006/0236014 A1* | 10/2006 | Yin | ....................... G06F 1/1632 |
| | | | 710/303 |
| 2008/0167095 A1 | 7/2008 | Kim et al. | |
| 2012/0176317 A1 | 7/2012 | Jin | |
| 2012/0194448 A1* | 8/2012 | Roth | ..................... G06F 1/1643 |
| | | | 361/679.01 |
| 2014/0185218 A1 | 7/2014 | Chen et al. | |
| 2015/0303993 A1* | 10/2015 | Showering | ............ G06F 1/1632 |
| | | | 455/41.1 |
| 2016/0147263 A1 | 5/2016 | Choi et al. | |
| 2016/0241076 A1 | 8/2016 | Bowers et al. | |
| 2016/0261995 A1* | 9/2016 | Zhu | ....................... G08B 21/182 |
| 2016/0334893 A1* | 11/2016 | Natarajan | ............. G06F 3/0221 |
| 2017/0060185 A1 | 3/2017 | Conners et al. | |
| 2017/0180359 A1* | 6/2017 | Wolski | .................... H04L 63/10 |

FOREIGN PATENT DOCUMENTS

| | | |
|---|---|---|
| CN | 104571277 A | 4/2015 |
| CN | 105892695 A | 8/2016 |
| CN | 106933377 | 7/2017 |
| CN | 206892735 U | 1/2018 |
| EP | 1494107 A2 | 1/2005 |

\* cited by examiner

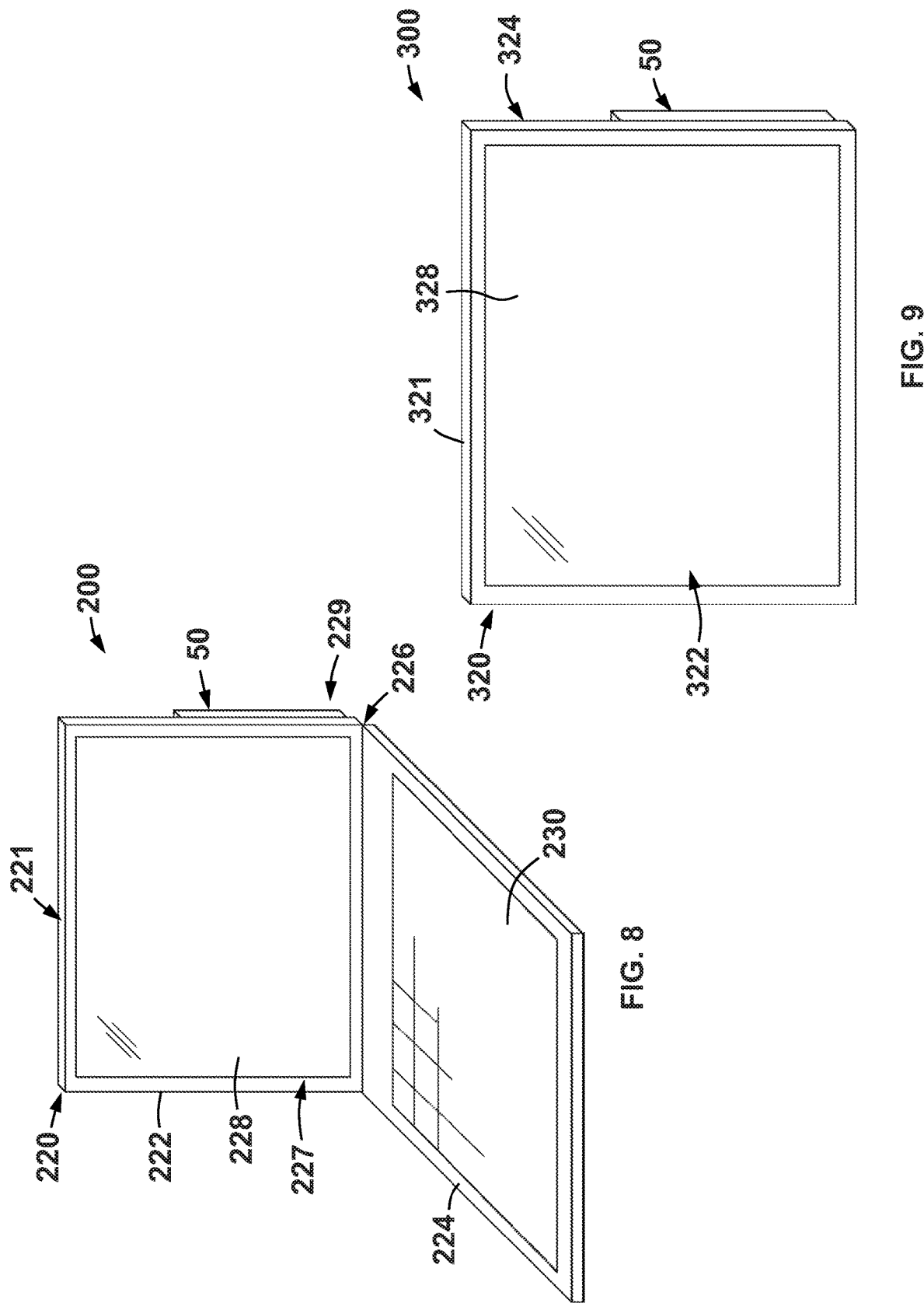

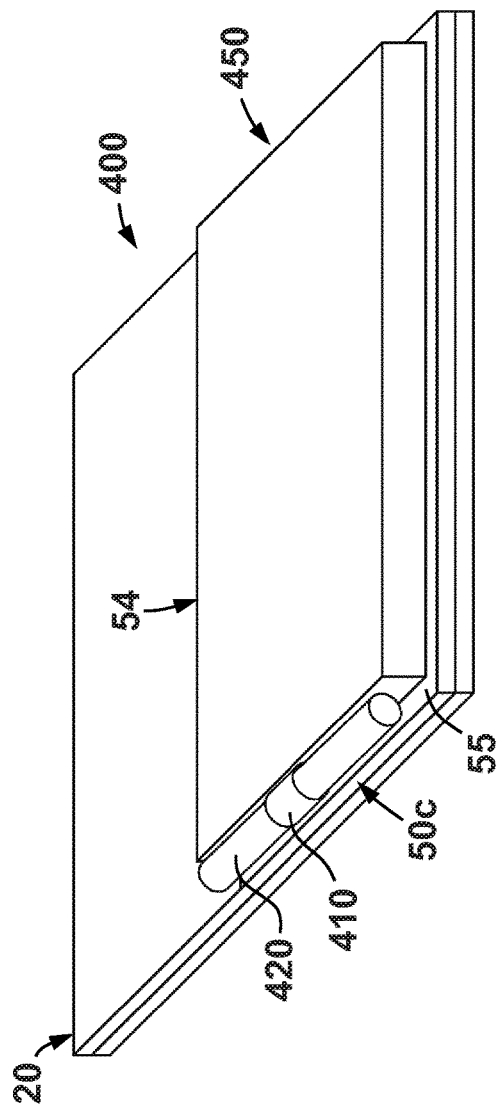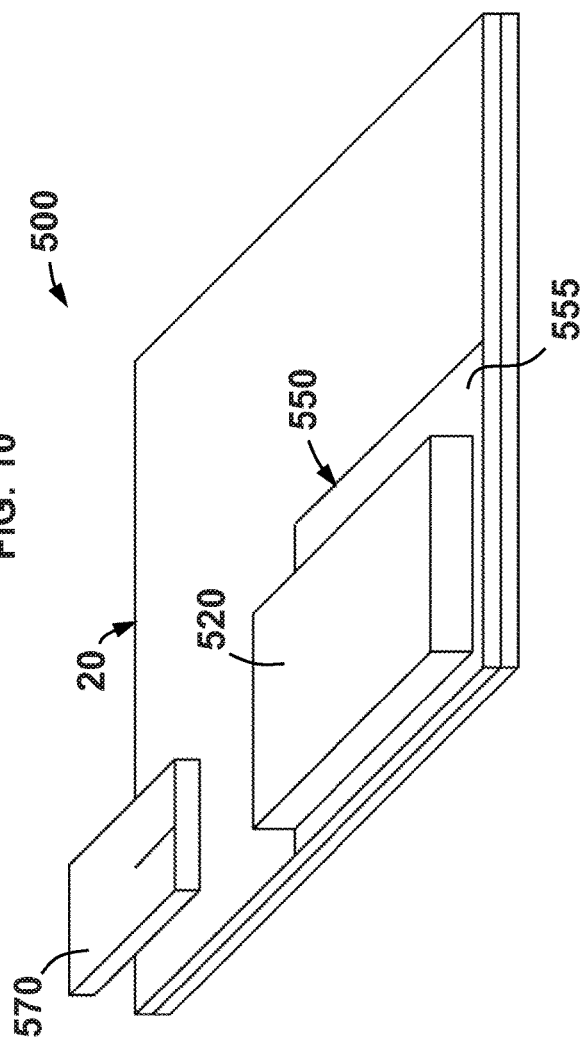

RECEPTACLES FOR ELECTRONIC DEVICES

BACKGROUND

Various accessory devices may be used to enhance the functionality of a computing device. It is desirable to store such devices along with or proximate to the computing device when the computing device or the accessory device are not in use.

BRIEF DESCRIPTION OF THE DRAWINGS

Various examples will be described below referring to the following figures:

FIG. 8 is a perspective view of another electronic device including a receptacle for an accessory device in accordance with some examples disclosed herein;

FIG. 9 is a perspective view of another electronic device including a receptacle for an accessory device in accordance with some examples disclosed herein;

FIG. 10 is a perspective view of another electronic device including a receptacle for an accessory device in accordance with some examples disclosed herein; and FIG. 11 is a perspective view of another electronic device including a receptacle for an accessory device in accordance with some examples disclosed herein.

DETAILED DESCRIPTION

In the figures, certain features and components disclosed herein may be shown exaggerated in scale or in somewhat schematic form, and some details of certain elements may not be shown in the interest of clarity and conciseness. In some of the figures, in order to improve clarity and conciseness, a component or an aspect of a component may be omitted.

In the following discussion and in the claims, the terms "including" and "comprising" are used in an open-ended fashion, and thus should be interpreted to mean "including, but not limited to . . . ." Also, the term "couple" or "couples" is intended to be broad enough to encompass both indirect and direct connections. Thus, when a first device couples to a second device, that connection may be through a direct connection or through an indirect connection via other devices, components, and connections. In addition, as used herein, the terms "axial" and "axially" generally refer to positions along or parallel to a central or longitudinal axis (e.g., central axis of a body or a port), while the terms "lateral" and "laterally" generally refer to positions located or spaced to the side of the central or longitudinal axis.

As used herein, including in the claims, the word "or" is used in an inclusive manner. For example, "A or B" means any of the following: "A" alone, "B" alone, or both "A" and "B." In addition, when used herein including the claims, the word "generally" or "substantially" means within a range of plus or minus 20% of the stated value.

Figure 1:
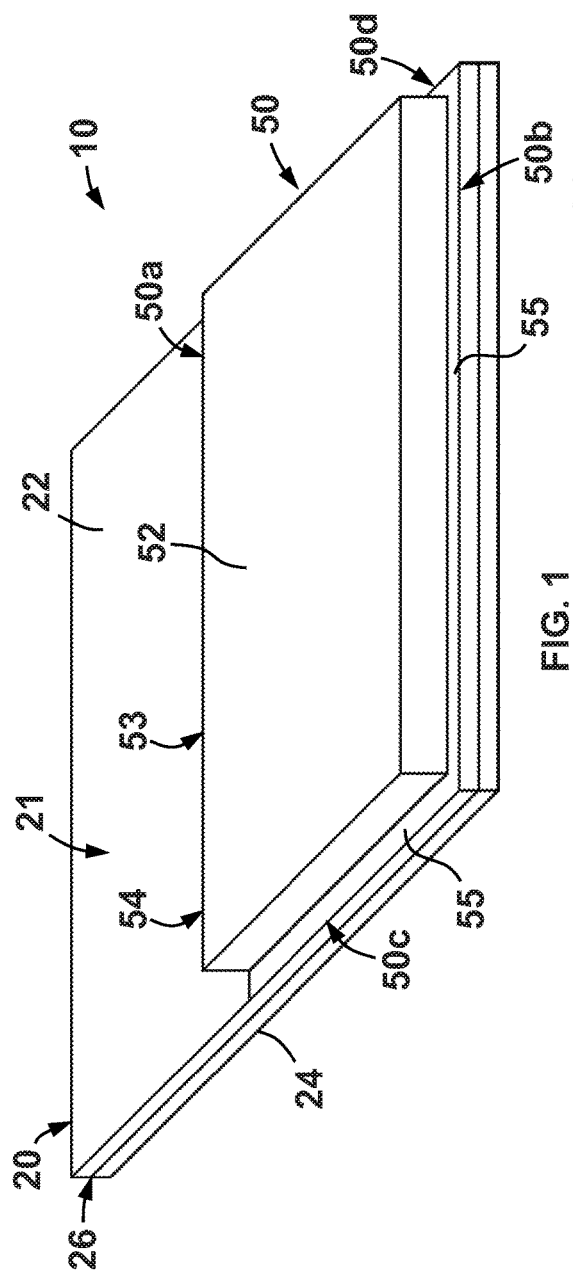
FIG. 1 shows a perspective view of an electronic device including a receptacle for an accessory device in accordance with examples disclosed herein.
Figure 2:
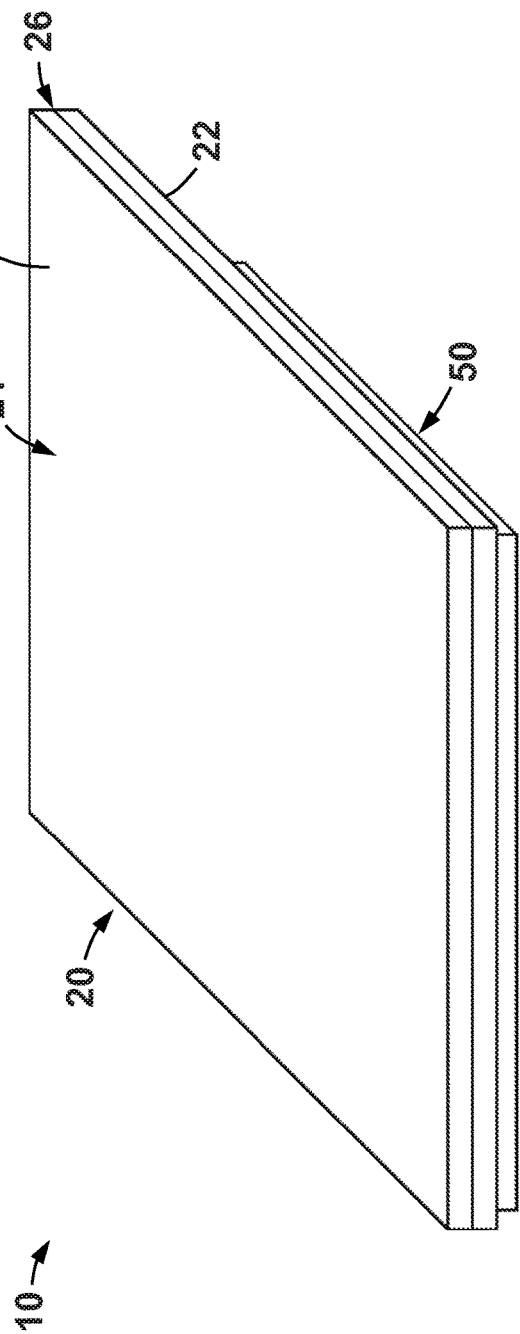
FIG. 2 is another perspective view of the electronic device of FIG. 1.
Figure 3:
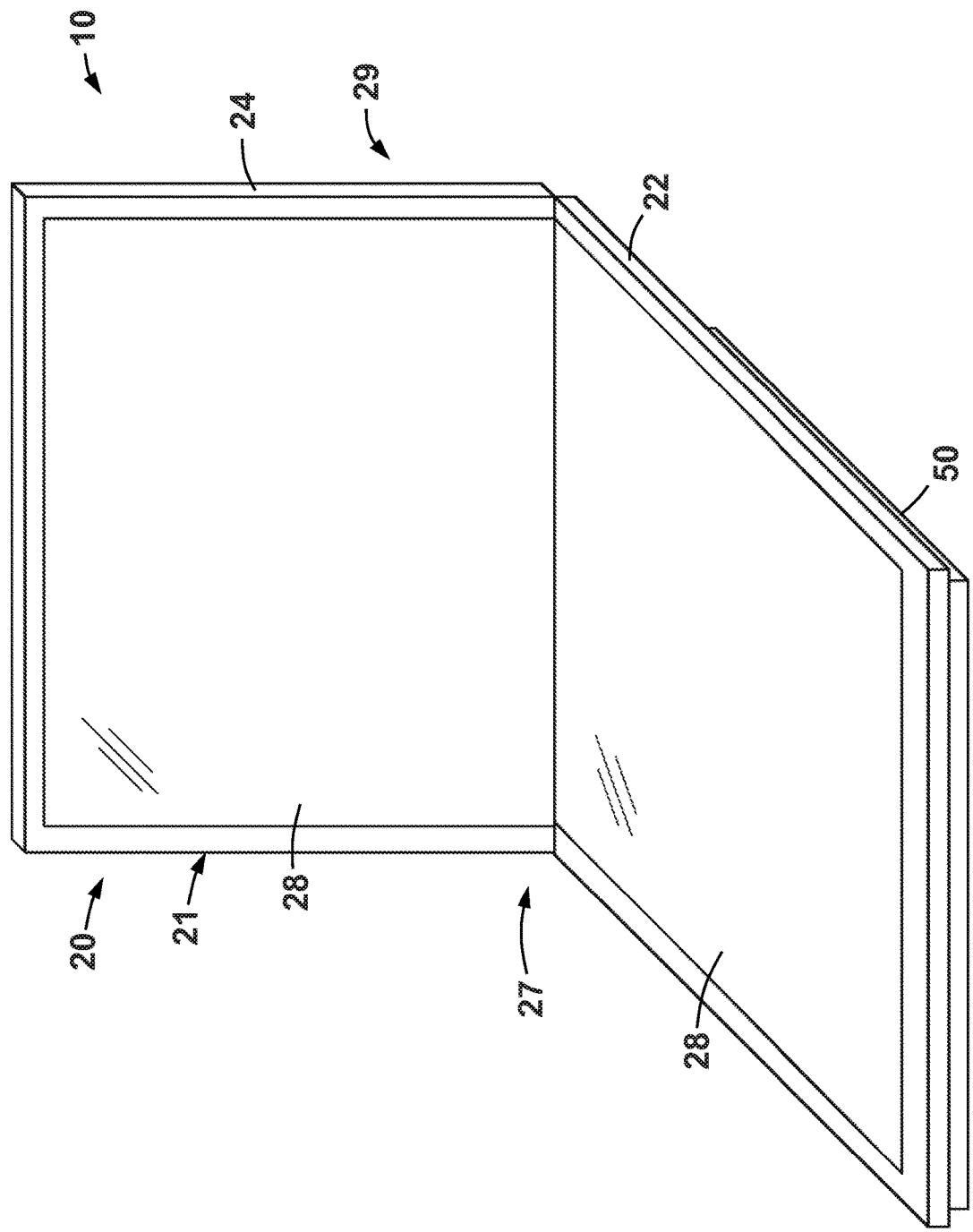
FIG. 3 is another perspective view of the electronic device of FIG. 1.

Referring now to FIGS. 1-3, an electronic device 10 including a receptacle 50 for an accessory device in accordance with some examples disclosed herein is shown. Electronic device 10 also includes a computing device 20. The receptacle 50 is disposed on the computing device 20.

In this example, computing device 20 comprises a housing 21 supporting a foldable display 28. The housing 21 includes a first housing member 22 rotatably coupled to a second housing member 24 at a hinge 26. Foldable display 28 (or more simply "display 28") is supported by both first housing member 22 and second housing member 24. As best shown in FIGS. 2 and 3, the computing device 20 is transitionable between a first or closed position as shown in FIG. 2 and a second or open position as shown in FIG. 3. When computing device 20 is in the closed position (FIG. 2), housing members 22, 24 are rotated about hinge 26 such that members 22, 24 are folded and stacked upon one another (and thus housing members 22, 24 extend in generally the same direction or angle from hinge 26). When computing device 20 is in the open position (FIG. 3), housing members 22, 24 are rotated about hinge 26 relative to one another from the closed position (FIG. 2) such that housing members 22, 24 extend at a non-zero angle to one another and display 28 is exposed. Accordingly, when computing device 20 is in the closed position (FIG. 2), display 28 is hidden by housing 21 (e.g., by housing members 22, 24).

As previously described, display 28 is "foldable." Thus, display 28 may be rolled, folded, or otherwise deformed while maintaining functionality and electrical connectivity. In some examples, while not specifically shown, display 28 includes a backlight, a substrate, and a controller, and some or all of these components may be foldable as described above. In some examples, display 28 may comprise a plurality of panels (e.g., with one panel that is supported by first housing member 22 and a second, separate panel that is supported by second housing member 24). In this example, display 28 includes a single panel that is supported by both housing members 22, 24. Therefore, display 28 may fold or deform when housing members 22, 24 are rotated about hinge 26 (e.g., during the transition between the open position and the closed position as previously described).

In this example, display 28 may employ any suitable visual display technology to show or present images for a user to view during use of the computing device 20. For example, in some implementations, display 28 may be a liquid crystal display (LCD), a plasma display, an organic light-emitting diode (OLED) display, etc. In this example, display 28 is a touch sensitive display that is to receive touch inputs from a user during use; however, display 28 may not be touch sensitive in other examples.

Referring specifically to FIG. 3, when computing device 20 is in the open position, display 28 is carried on a first side 27 of housing 21. Because a user of the computing device 20 may view display 28, the first side 27 may be referred to herein as a front side of the housing 21. Accordingly, when computing device 20 is in the open position, a second side 29 opposite the front side 27 (and thus opposite the display 28) is also defined that may be referred to herein as the back side 29 of the housing 21.

Referring again to FIGS. 1-3, receptacle 50 is disposed on the back side 29 of housing 21. Stated another way, receptacle 50 is disposed on housing 21 on a side opposite the display 28. As is described in more detail below, receptacle 50 is to receive and store an accessory device (not shown) for use with computing device 20 (or a plurality of accessory devices for use with computing device 20). The accessory device may be any suitable device that is usable with computing device 20 to perform a function or multiple functions with computing device 20. In some implementations, the accessory device may be a user input device that is to allow a user to provide inputs to the computing device 20. For example, the accessory device may comprise a keyboard, a mouse, a stylus, a touchpad, or a combination of these devices.

Figure 4:
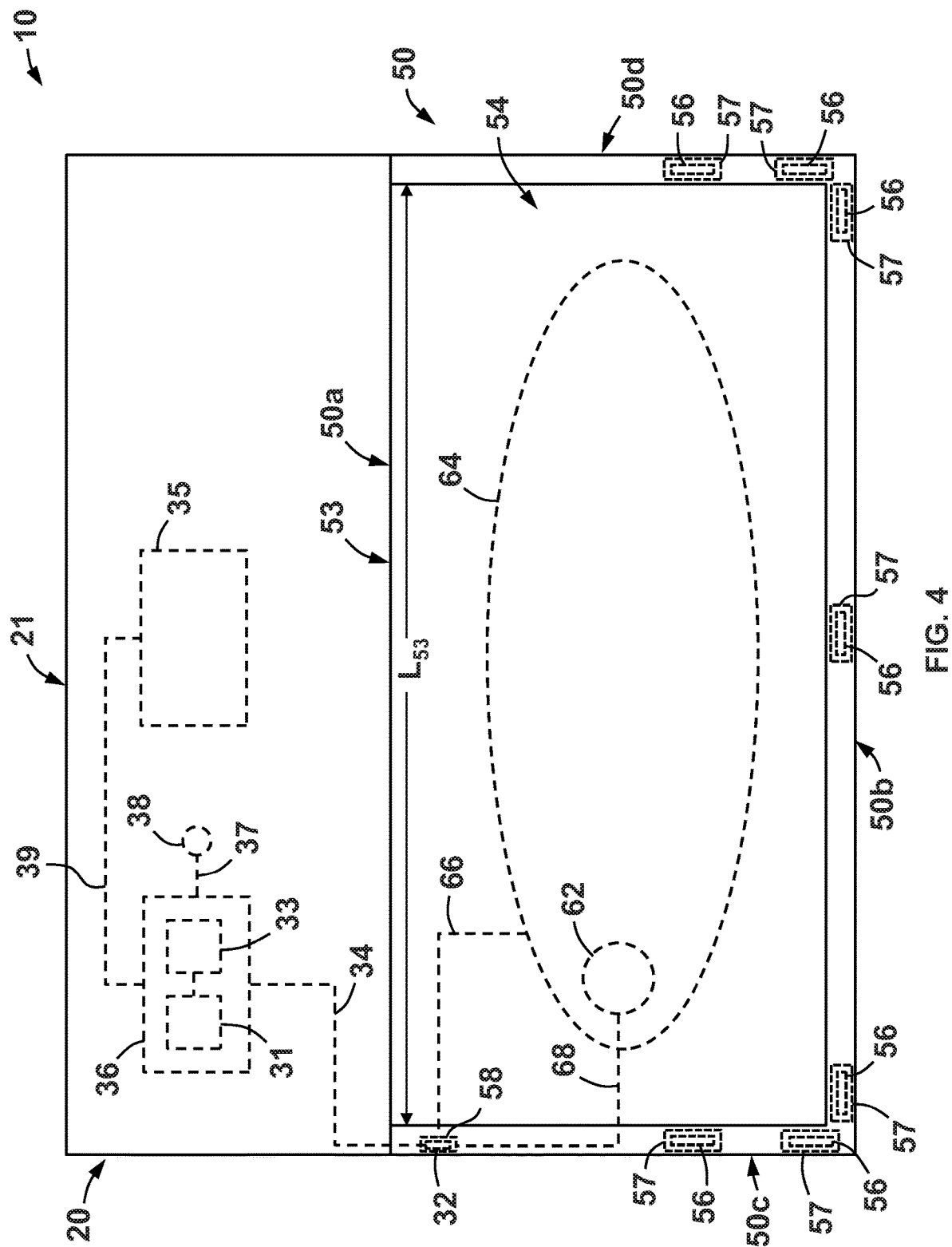
FIG. 4 is a schematic view of the electronic device of FIG. 1.

Referring now to FIGS. 1 and 4, in this example, receptacle 50 comprises a receptacle wall 52 and an engagement section or border 55 extending about a portion of receptacle wall 52. When receptacle 50 is disposed on computing device 20, engagement section 55 engages with first housing member 22 and receptacle wall 52 extends away from engagement section 55 and first housing member 22 to define a pocket or recess 54 between receptacle wall 52 and first housing member 22. Engagement section 55 extends along all but one side of receptacle 50, along which receptacle wall 52 defines an opening 53 into pocket 54. In particular, in this example, first housing member 22 is generally rectangular, and thus, receptacle 50 has a similar rectangular shape to conform and mate with first housing member 22. Therefore, when receptacle 50 is disposed on first housing member 22, a perimeter is defined that includes a total of four sides 50a, 50b, 50c, 50d, with side 50a opposing side 50b and side 50c opposing side 50d. Engagement section 55 extends along the sides 50b, 50c, 50d but not along side 50a which carries opening 53. Thus, side 50a may be referred to as an open side 50a. As shown in FIG. 4, opening 53 and pocket 54 have a total length $L_{53}$ along housing member 22.

In this example, receptacle 50 is removably coupled to computing device 20. Specifically, in this example, engagement section 55 includes a plurality of magnets 56 that are attracted to a plurality of corresponding magnets 57 disposed within first housing member 22 to thereby hold or fix receptacle 50 to first housing member 22 during operations. The magnets 56, 57 within receptacle 50 and computing device 20 may be arranged such that receptacle 50 may only be attached or secured to computing device 20 in a predetermined location and orientation (e.g., such as on first housing member 22 as shown). Other suitable removable coupling methods may be used to attach receptacle 50 to computing device 20 in other implementations, such as, for example, hook and loop connectors, snaps, etc. In some implementations, engagement section 55 has an interference fit (or snaps onto) the perimeter (or portion thereof) of first housing member 22 so that the friction of the engagement between engagement section 55 and first housing member 22 prevents the un-desired removal of receptacle 50 from computing device 20. While the example of FIGS. 1-4 shows receptacle 50 to be removably coupled to computing device 20, receptacle may be permanently attached to computing device 20 in other implementations. For example, receptacle 50 may be an integral portion of housing member 22.

In still other examples, receptacle 50 may be formed or included on a cover or case for housing 21 of computing device 20. In these examples, the cover may engage with and overlap the housing members 22, 24 to provide a protective barrier around housing 21 to lessen or avoid damage from impacts, in addition to defining or carrying receptacle 50.

Referring still to FIG. 4, electronic components are embedded within receptacle 50, particularly within receptacle wall 52 and engagement section 55. In this example, receptacle 50 includes a proximity sensor 62 and a wireless charging coil 64 embedded within receptacle wall 52. The sensor 62 and coil 64 are electrically coupled to a connector 58 mounted on engagement section 55 (specifically on engagement section 55 along side 50c) via a pair of electrical conductors 68 and 66, respectively.

As shown in FIG. 4, when receptacle 50 is engaged with computing device 20 (e.g., first housing member 22), connector 58 engages with a corresponding connector 32 on housing 21 of computing device 20, which is further electrically coupled to electronics within computing device 20. As a result, when receptacle 50 is engaged with computing device 20 as shown, sensor 62 and coil 64 are electrically coupled to computing device 20 (particularly to the electronics within computing device 20).

In this example, computing device 20 includes a controller assembly 36 that is electrically coupled to connector 32 via electrical conductor 34. In addition, computing device 20 includes a wireless communication antenna 38 coupled to controller assembly 36 via a conductor 37, and a power source 35 coupled to controller assembly 36 via an electrical conductor 39.

Controller assembly 36 may comprise any suitable device or assembly which is capable of receiving an electrical signal and transmitting various electrical signals to other devices (e.g., sensor 62, coil 64, antenna 38, etc.). In particular, in this example, controller assembly 36 includes a processor 31 and a memory 33. The processor 31 (e.g., microprocessor, central processing unit, or collection of such processor devices, etc.) executes machine readable instructions provided on memory 33 to provide the processor 31 with all of the functionality described herein. The memory 33 may comprise volatile storage (e.g., random access memory), non-volatile storage (e.g., flash storage, read only memory, etc.), or combinations of both volatile and non-volatile storage. Data consumed or produced by the machine readable instructions can also be stored on memory 33.

Communication antenna 38 is to send and receive wireless communication signals to and from, respectively, another device (e.g., an accessory device). Communication antenna 38 may utilize any suitable wireless communication technology, such as, for example, BLUETOOTH®, WIFI, radio frequency (RF) communication, infrared communications, acoustic communications, etc. Signals sent by antenna 38 are generated in controller assembly 36 (e.g., by processor 31) and communicated to antenna 38 via conductor 37, and signals received by antenna 38 are communicated to controller assembly 36 (e.g., processor 31) via conductor 37.

Power source 35 provides electrical power to other electronic components within computing device 20 (e.g., display 28, controller assembly 36, antenna 38, etc.). In particular, power source 35 provides electrical power to controller assembly 36 via conductor 39. Power source 35 may comprise any suitable source of electrical power such as, for example, a battery, capacitor, a converter or transformer that is supplied by mains power, etc. In this example, power source 35 is a rechargeable battery.

Referring still to FIG. 4, when receptacle 50 is mounted to computing device 20 as shown, controller assembly 36 is electrically coupled to the sensor 62 and coil 64 via engaged connectors 32, 58. As a result, during operations, controller assembly 36 may send and receive signals (e.g., electrical signals) from sensor 62 and coil 64.

The electrical conductors 66, 68, 34, 37, 39 may be any suitable conduit for facilitating the flow of electrical current therealong. For example, in this implementation, conductors 66, 68, 34, 37, 39 are wires.

Figure 5:
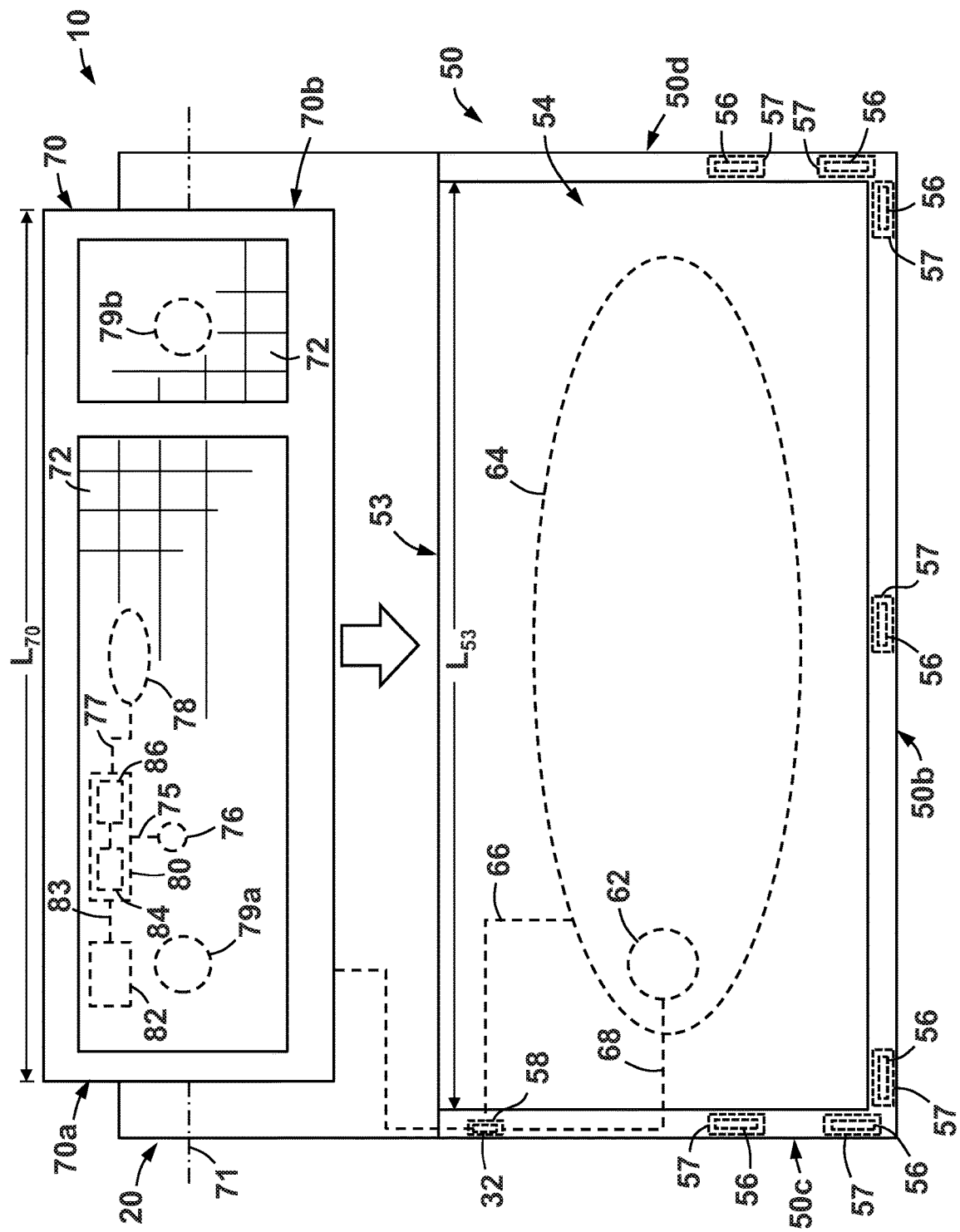
FIG. 5 is another schematic view of the electronic device of FIG. 1 and a keyboard for insertion within a receptacle of the electronic device.
Figure 6:
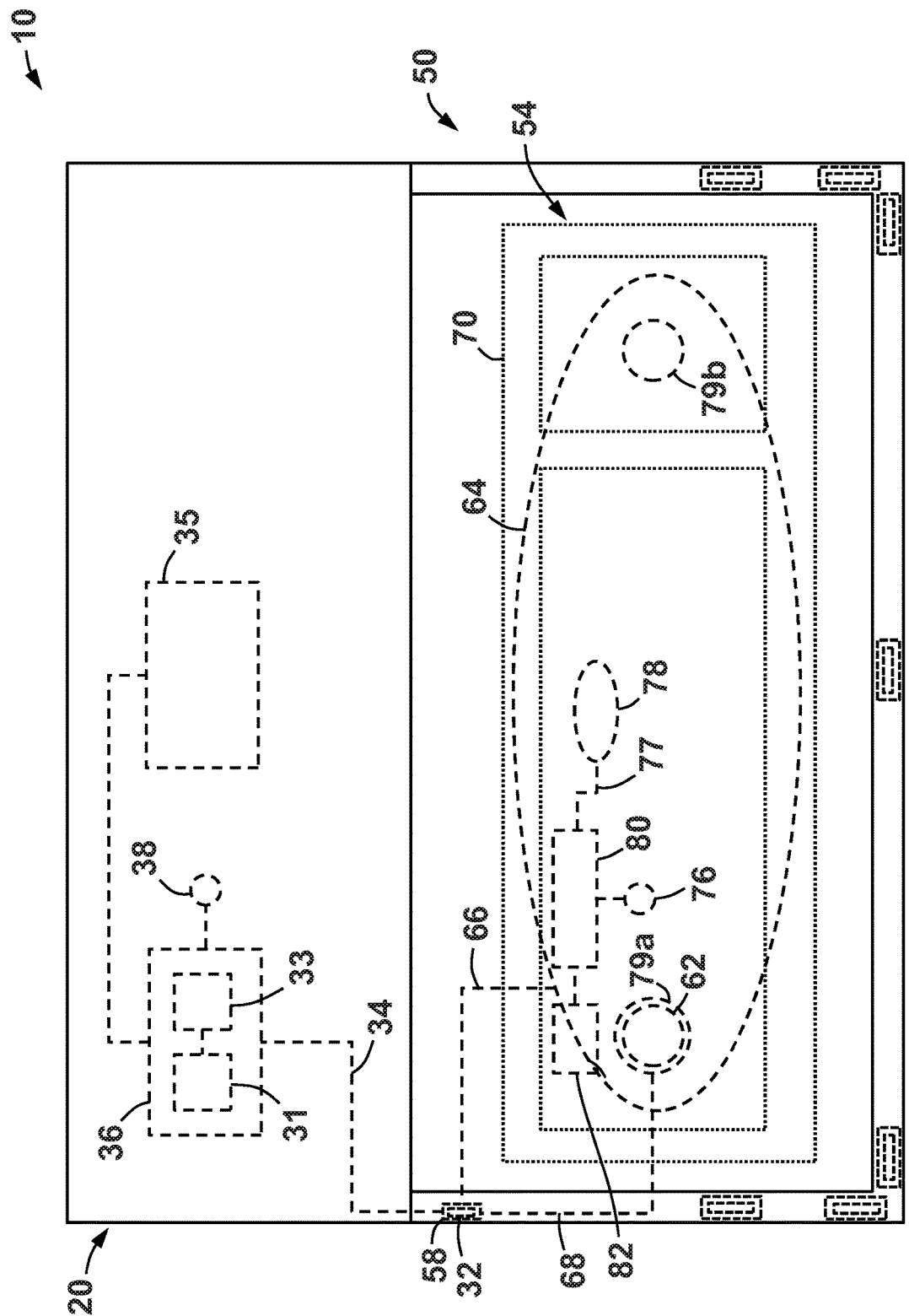
FIG. 6 is another schematic view of the electronic device with the keyboard received within the receptacle of the electronic device.

Referring now to FIGS. 5 and 6, during operations, an accessory device 70 may be placed within pocket 54 of receptacle 50 when the accessory device 70 is not in use. For example, in this implementation, accessory device 70 is a wireless keyboard that includes a plurality of keys or buttons 72 that are to be engaged by a user to provide inputs to an electronic device (e.g., computing device 20) during operation thereof. Accordingly, for purposes of describing this implementation, accessory device 70 may be referred to as keyboard 70. When a user is not utilizing keyboard 70 to provide inputs to computing device 20, keyboard 70 may be inserted or stored within receptacle 50 (i.e., within pocket 54).

Keyboard 70 is a rectangular member that is elongated along a longitudinal axis 71. A pair of terminal ends 70a, 70b are axially separated from one another along axis 71 such that the axial distance between ends 70a, 70b defines a total longitudinal length $L_{70}$ for keyboard 70. The length $L_{70}$ of keyboard 70 is less than the length $L_{53}$ of opening 53 and pocket 54 of receptacle 50 such that keyboard 70 may be inserted within pocket 54 via opening 53 during operations (as shown in FIG. 6).

Keyboard 70 also includes a pair of magnets 79a, 79b. Magnets 79a, 79b may be either disposed within keyboard 70 or disposed along an outer surface thereof. In this example, magnets 79a, 79b are internally disposed within keyboard 70. Magnets 79a, 79b are axially separated from one another along axis 71 such that magnet 79a is more proximate to first end 70a than second end 70b, and magnet 79b is more proximate to second end 70b than first end 70a. Magnets 79a, 79b may be any suitable magnet or magnetic device that is to generate an magnetic field. In some examples, magnets 79a, 79b are electro-magnets, and in other examples, magnets 79a, 79b are permanent magnets. In this example, magnets 79a, 79b are permanent magnets comprising a permanently magnetic material.

Referring still to FIGS. 5 and 6, keyboard 70 further includes a controller assembly 80, a power source 82, a wireless communication antenna 76, and a power antenna 78. Power antenna 78 comprises a charging coil that is electrically coupled to controller assembly 80 and power source 82 via an electrical conductor 77.

Controller assembly 80 includes a processor 84 and a memory 86. Wireless communication antenna 76 is coupled to controller assembly 80 via an electrical conductor 75 such that antenna 76 sends and receives signals to and from, respectively, controller assembly 80 during operations. Power source 82 (which is a rechargeable battery in this example) is coupled to controller assembly 80 via an electrical conductor 83 to provide electrical power to controller assembly 80 and other components within keyboard 70 (e.g., antennas 76, 78). Processor 84, memory 86, power source 82, and communication antenna 76 are generally the same (or similar) to processor 31, memory 33, power source 35, and antenna 38, respectively, of computing device 20. Thus, the same general description of processor 31, memory 33, power source 35, and antenna 38 of computing device 20 may be applied to describe processor 84, memory 86, power source 82, and communication antenna 76, respectively, in keyboard 70. In addition, as described above for the electrical conductors of computing device 20 and receptacle 50, the electrical conductors 83, 75, 77 may be any suitable conduit for facilitating the flow of electrical current therealong. For example, in this implementation, conductors 83, 75, 77 are wires.

Figure 7:
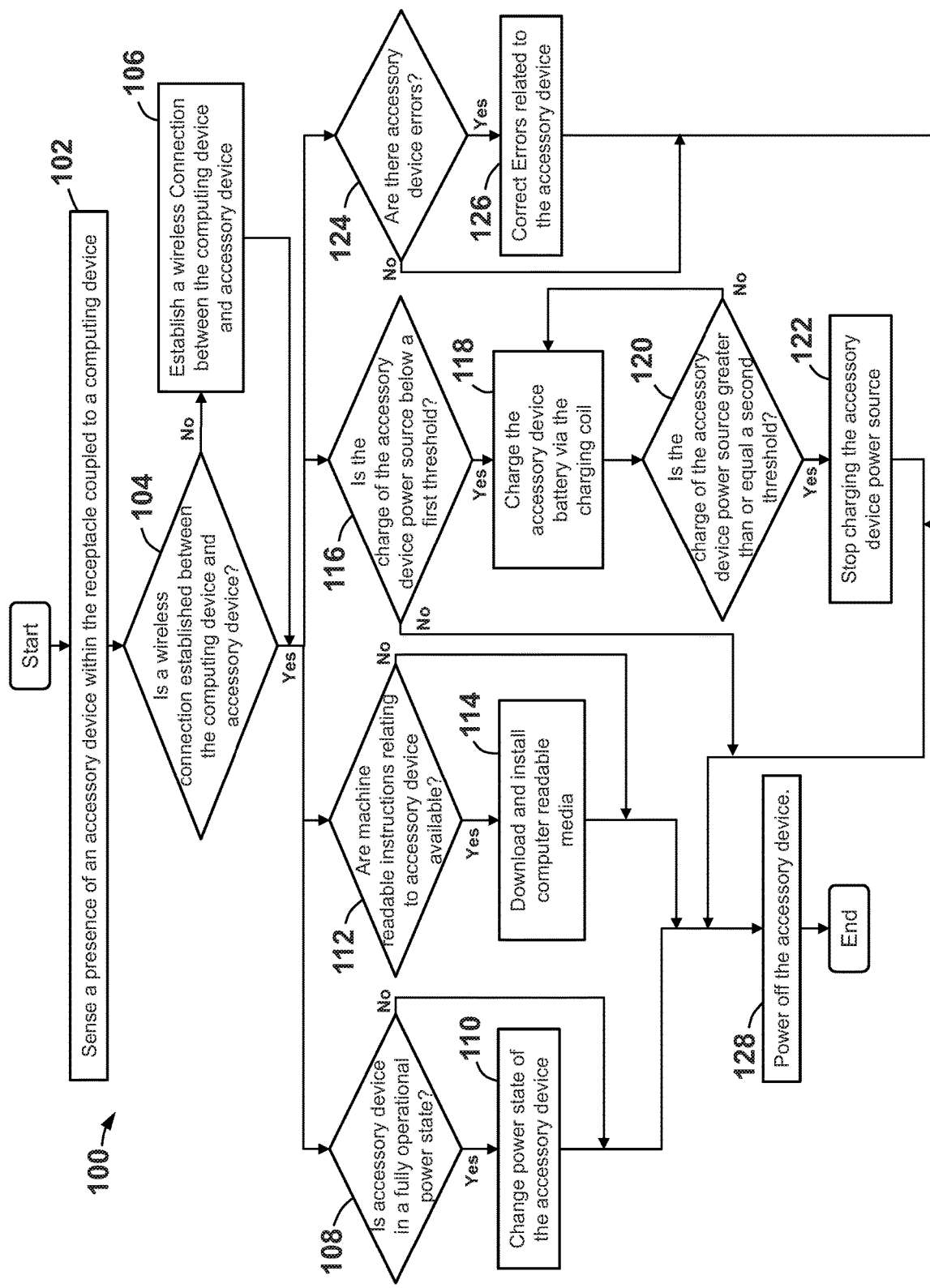
FIG. 7 is a block diagram of a method for conditioning an accessory device that is disposed within a receptacle of an electronic device in accordance with some examples disclosed herein.

Referring now to FIGS. 6 and 7, during operations, when keyboard 70 is not needed to provide inputs to computing device 20, keyboard 70 may be placed within pocket 54 of receptacle 50 via opening 53 as previously described. In this implementation, the placement of keyboard 70 within pocket 54 triggers a routine (or plurality of routines) for computing device 20. Method 100 shown in FIG. 7 depicts example routines performed by a computing device (e.g., computing device 20) relating to an accessory device (e.g., keyboard 70) upon insertion of the accessory device within a receptacle (e.g., receptacle 50). In explaining the features of method 100, reference is made to the components and features of the examples shown in FIGS. 1-6; however, method 100 may be performed with other structures and components that are different from those shown in the example of FIG. 6 (e.g., such as the electronic devices 200, 300, 400, 500 described below). In addition, while a specific order is depicted for the features of method 100, no specific order of the features is intended unless otherwise specifically described herein. Accordingly, the order of the features shown in method 100 may be varied in other examples.

Initially, method 100 begins by sensing a presence of an accessory device within a receptacle coupled to (e.g., disposed on) a computing device 20 at 102. In the example, the presence of keyboard 70 is sensed via sensor 62. Specifically, the relative sizing and shape of pocket 54 and keyboard 70 are such that when keyboard 70 is fully inserted within pocket 54, one of the magnets 79a, 79b is placed proximate to proximity sensor 62. Because keyboard 70 includes a pair of magnets 79a, 79b, keyboard 70 may be placed within pocket 54 in a number of different orientations while still allowing one of the magnets 79a, 79b to be in relatively close proximity to sensor 62. In this example, proximity sensor 62 may be implemented as a magnetic sensor. Proximity sensor 62 is to sense a magnetic field (e.g., the magnetic field generated by magnets 79a, 79b). Once the strength of the magnetic field sensed by sensor 62 reaches a predetermined threshold, controller assembly 36 (e.g., processor 31) within computing device 20 determines that keyboard 70 is disposed within pocket 54 and initiates further routines.

Returning to FIG. 7, method 100 also includes determining when a wireless connection is established between the computing device and accessory device at 104. For example, in the implementation of FIG. 6, upon sensing the presence of keyboard 70 within pocket 54 of receptacle 50 via sensor 62, controller assembly 36 may determine when a wireless connection is established between communication antennas 38, 76. When a user has already utilized keyboard 70 to provide inputs to computing device 20, this connection may already be established. Stated another way, in this situation, the determination at block 104 is "yes" and method 100 proceeds to blocks 108, 112, 116 (described below). When however, the determination at block 104 is "no" and there is not wireless connection established between the computing device and accessory device, method 100 proceeds to block 106, wherein such a wireless connection is established. For instance, in the example of FIGS. 1-6, when controller assembly 36 determines that no wireless connection exists with keyboard 70 (e.g., such as when the user has not previously utilized keyboard 70 to provide inputs on computing device 20 or when a previous wireless connection has been lost or removed), the controller assembly 36 may then automatically establish a wireless connection between antennas 38, 76 (e.g., controller assembly 36 may initiate a wireless pairing sequence) such that wireless communication between controller assembly 36 within computing device 20 and controller assembly 80 within keyboard 70 is established.

Returning again to FIG. 7, following the establishment (or confirmation) of a wireless connection between the computing device and accessory device at blocks 104, 106, method 100 moves on to perform additional routines at blocks 108, 112, 116. These parallel routines will be described below with continuing reference to the example implementation of FIGS. 1-6.

Specifically, at block 108, method includes a determination as to whether the accessory device is in a fully operational power state. Stated another way, block 108 determines whether the accessory device that is disposed within the receptacle is in a power state associated with full functionality of the accessory device. When the determination at block 108 is "yes," then method 100 proceeds to change the power state of the accessory device at block 110. For example, in some implementations of method 100, the change in the accessory device power state at block 110 is to lower the power state from the fully operational power state to a second or lower power state (where some of the functionality of the accessory device is ceased and the power demands on the accessory device power source (e.g., power source 82) are lowered from the fully operational power state).

To further illustrate the features of blocks 108, 110 in method 100, reference is again made to the implementation of FIGS. 1-6. In this implementation, upon establishing a wireless connection between computing device 20 and keyboard 70 (e.g., between controller assemblies 36, 80 via antennas 38, 76), controller assembly 36 may then determine the current power state of the keyboard 70 (e.g., by querying controller assembly 80) (see block 108 in FIG. 7). In response to a determination that the keyboard 70 is in a fully operational state (e.g., such as the power state implemented within keyboard 70 when a user is utilizing keyboard 70 to provide inputs to computing device 20), the controller assembly 36 may issue a command to controller assembly 80 within keyboard 70 to lower the power state of keyboard 70 to a reduced functionality power state (e.g., sleep mode) (see block 110 in FIG. 7). When in the reduced functionality power state, the demands on power source 82 are reduced, thereby conserving electrical energy for subsequent use of keyboard 70 by a user and/or additional routines to be carried out by keyboard 70 while keyboard 70 is disposed within pocket 54 of receptacle 50. In some examples, controller assembly 36 may command keyboard 70 to transition to a power off state, where all (or substantially all) electrical current flowing from power source 82 to the other components within keyboard 70 (e.g., antennas 76, 78, controller assembly 80) is ceased.

Returning again to FIG. 7, upon establishing (or confirming) the wireless connection between the computing device and accessory device at blocks 104, 106, method 100 also includes a determination as to whether there are available machine readable instructions relating to the accessory device at block 112. When this determination in block 112 is "yes" (i.e., there are available machine readable instructions relating to the accessory device), method 100 proceeds to download and install these machine readable instructions at block 114.

In particular, to further illustrate the features of blocks 112, 114, reference is again made to the example of FIGS. 1-6, wherein upon sensing the presence of the keyboard 70 within pocket 54 of receptacle 50 via sensor 62, computing device 20 (e.g., via controller assembly 36) may check for available machine readable instructions relating to keyboard 70. The machine readable instructions relating to keyboard 70 may comprise driver machine readable instructions or updates thereto to ensure proper interaction and communication between keyboard 70 and computing device 20). Specifically, in some implementations, computing device 20 may access the internet or keyboard 70 itself (e.g., memory 86) to check for available machine readable instructions. When such machine readable instructions relating to keyboard 70 are available from a given source (e.g., the internet, memory 86, etc.), they are then downloaded and installed onto computing device 20 (e.g., memory 33) and/or keyboard 70 as appropriate (see block 114 in FIG. 7). In some implementations, computing device 20 checks for available machine readable instructions relating to keyboard 70 and downloads and installs such available instructions all upon sensing the presence of keyboard 70 within pocket 54 of receptacle 50 via sensor 62. In other implementations, computing device 20 checks for available instructions relating to keyboard 70 and downloads the same before keyboard 70 is placed within pocket 54 (e.g., such as when a user is utilizing keyboard 70 to provide inputs on computing device 20), and then computing device 20 installs those instructions onto computing device 20 and/or keyboard 70 once the presence of keyboard 70 is sensed within pocket 54 of receptacle 50 via sensor 62.

Referring again to FIG. 7, upon establishing (or confirming) the wireless connection between the computing device and accessory device at blocks 104, 106, method 100 also includes a determination as to whether the charge of the power source within the accessory device is below a threshold at block 116. When the determination at block 116 is "yes" (i.e., the charge of the power source of the accessory device is below a first threshold), method 100 proceeds to charge the power source of the accessory device at block 118. Thereafter, block 120 determines whether the charge of the power source of the accessory device is equal to or above a second threshold (which is greater than the first threshold from block 116). When the determination in block 120 is "no," (i.e., the charge of the power source of the accessory device is not equal to or greater than the second threshold), then method 100 returns to block 118 to continue charging the accessory device power source. When, on the other hand, the determination in block 120 is "yes" (i.e., the charge of the accessory device power source is equal to a or greater than the second threshold), then method 100 proceeds to stop the charging of the accessory device power source at 122.

In particular, to further illustrate the features of blocks 116, 118, 120, 122, reference is again made to the example of FIGS. 1-6, wherein upon sensing the presence of the keyboard 70 within pocket 54 of receptacle 50 via sensor 62, computing device 20 (e.g., via controller assembly 36) determines whether power source 82 within keyboard 70 has a predetermined minimum amount of electrical charge (i.e., whether power source 82 charge is below a predetermined first threshold as in block 116 of FIG. 7). For example, controller assembly 80 may determine the charge of power source 82 (e.g., as a percentage of full capacity) and communicate this information to controller assembly 36 within computing device 20 via antennas 38, 76 in response to a query from controller assembly 36. When the determined electrical charge of power source 82 is below a predetermined first threshold (e.g., 50%, 60%, 70%, 80%, etc., of full capacity), then controller assembly 36 may induce an electric current from power source 35 in computing device 20 through charging coil 64 in receptacle 50 via conductors 39, 34, 66, and connectors 32, 58 as previously described. The flow of electric current through charging coil 64 generates a magnetic field which further induces a corresponding flow of electrical current through the charging coil of power antenna 78. This induced electrical current in antenna 78 flows back to power source 82 in keyboard 70 via conductors 77, 83 to thereby increase the electrical charge of power source 82 (e.g., see block 118 of FIG. 7). This charging sequence may continue until controller assembly 80 determines that the charge of power source 82 has reached (or is above) a predetermined second threshold (e.g., 60%, 70%, 80%, 90%, 99%, 100%, etc., of full capacity), and communicates this information to controller assembly 36 within computing device 20 (i.e., see block 120 in FIG. 7). Thereafter, controller assembly 36 stops the flow of electric current from power source 35 to coil 64 and the charging operation of power source 82 in keyboard 70 is ceased (i.e., block 122 in FIG. 7).

Referring again to FIG. 7, upon establishing (or confirming) the wireless connection between the computing device and accessory device at blocks 104, 106, method 100 also includes a determination at block 124 as to whether there are any errors associated with the accessory device. When the determination at block 124 is "yes" (i.e., there are errors associated with the accessory device), method 100 proceeds to correct the detected errors at block 126 (or at least some of the detected errors), such as by downloading or installing machine readable instructions for addressing the detected error(s). In particular, to further illustrate the features of blocks 124, 126, reference is again made to the example of FIG. 6, wherein computing device 20 may initiate a testing protocol (e.g., via controller assembly 36) to test keyboard 70 for errors. For example, computing device 20 may test keyboard 70 for errors relating to hardware (e.g., power source 82, antennas 76, 78, keys 72, etc.) and/or errors relating to machine readable instructions (e.g., driver instructions for operating keyboard 70 with computing device 20, etc.). In these examples, controller assembly 36 may communicate with controller assembly 80 within keyboard 70 via antennas 38, 76 to test keyboard 70 for errors as described above. For errors that computing device 20 may not be able to correct (e.g., such as some errors relating to hardware on keyboard 70), method 100 may additionally include delivering a message to the user (e.g., via display 28 on computing device 20) relating to the detected error (and potentially providing recommendations for addressing said error).

Referring again to FIG. 7, after the conclusion of the actions described in blocks 110, 114, 122, 126, and when the determinations at blocks 108, 112, 116, 124 are "no," method 100 proceeds to further power off the accessory device at block 128. In particular, in this implementation, the accessory device was placed in a lowered power state at block 110 in order to reduce the load on the accessory device power source, but to allow for sufficient functionality for the routines of blocks 112, 114, 116, 118, 120, 122, 124, 126. Upon the conclusion of these routines, method 100 may further power off the accessory device to a fully off power state (i.e., where substantially all of the functionality of the accessory device is ceased).

In the examples described above, an electronic device (e.g., electronic device 10) includes a computing device (e.g., computing device 20) and a receptacle (e.g., receptacle 50) disposed on the computing device that allows a user to simply place an accessory device (e.g., keyboard 70) within the receptacle to trigger or initiate a number of different conditioning and connection routines that enhance and support the use of the accessory device with the computing device. Thus, a user's experience is greatly simplified with respect to the storage and use of the accessory device with the computing device.

Other examples of an electronic device (e.g., electronic device 10) are now disclosed that are different from previously described electronic device 10. However, components of these additional examples that are the same as those found on electronic device 10 are identified with the same reference numerals, and the discussion below will focus on the features of these additional electronic devices that are different from those found on electronic device 10.

Referring now to FIG. 8, an electronic device 200 that includes a computing device 220 and receptacle 50 is shown. Receptacle 50 is the same as described herein for the example of FIGS. 1-6, and thus, the previous description of this component applies to the example of FIG. 8. However, in this example, computing device 220 is a laptop computer rather than the computing device 20 (which includes foldable display 28), previously described.

In this example, computing device 220 includes a housing 221 that includes a first housing member 222 rotatably coupled to a second housing member 224 at a hinge 226. First housing member 222 supports a display 228 that is generally the same as display 28, previously described above, and second housing member 224 supports a keyboard 230. As with electronic device 10, computing device 220 is transitionable between a first or closed position (not shown) where housing members 222, 224 are stacked upon one another (and thus extend in the same direction from hinge 226), and a second or open position (FIG. 4) where housing members 222, 224 are rotated about hinge 226 relative to one another from the closed position, such that housing members 222, 224 extend at a non-zero angle to one another and a display 228 and keyboard 230 are exposed. Thus, when computing device 220 is in the closed position, display 228 and keyboard 230 are hidden by housing 221.

In addition, as is also described above for electronic device 10, when electronic device 200 is in the open position, display 228 and keyboard 230 are carried on a first side 227 of computing device 220. Because a user of the computing device 200 may view display 228 and keyboard 230 during use, the first side 227 may be referred to herein as a front side of housing 221 of computing device 220. Accordingly, when electronic device 200 is in the open position, a second side 229 opposite the front side 227 (and thus opposite the display 228 and keyboard 230) is also defined, and may be referred to herein as the back side 229. In this example, receptacle 50 is disposed on the back side 229 of housing 221 of computing device 200. Stated another way, receptacle 50 is disposed on housing 221 on a side opposite the display 228.

All other functions and features of electronic device 200 are the same as those described above for computing device 10. For example, method 100 may be carried out using electronic device 200 in a similar fashion to that described above for electronic device 10. Accordingly, a detailed description of these additional and similar components and functions is not included herein in the interest of brevity.

Referring now to FIG. 9, an electronic device 300 is shown that includes a computing device 320 and receptacle 50. Receptacle 50 is the same as described herein for the example of FIGS. 1-6, and thus, the previous description of this component applies to the example of FIG. 9. However, in this example, computing device 320 is a tablet computer rather than the computing device 20 (which includes foldable display 28), previously described.

In this example, computing device 320 includes a housing 321 that includes a first side 322 and a second side 324 opposite first side 322. First side 322 supports a display 328 that is generally the same as display 28, previously described above. Therefore, because a user will view display 328 during use, first side 322 may be referred to herein as a front side 322 of housing 321, and the second side 324 may be referred to herein as a back side 324. In this example, receptacle 50 is disposed on the back side 324 of housing 321 of computing device 320. Stated another way, receptacle 50 is disposed on housing 321 on a side opposite the display 328.

All other functions and features of the electronic device 300 are the same as those described above for computing device 10. For example, method 100 may be carried out using electronic device 300 in a similar fashion to that described above for electronic device 10. Accordingly, a detailed description of these additional and similar components and functions is not included herein in the interest of brevity.

Referring now to FIG. 10, an electronic device 400 is shown that includes computing device 20 and a receptacle 450. Computing device 20 is the same as described herein for the example of FIGS. 1-6 and thus, the previous description of this component applies to the example of FIG. 10. In addition, receptacle 450 is generally the same as receptacle 50 described herein for the example of FIGS. 1-6; however, in addition to the features of receptacle 50, receptacle 450 also includes a holder 410 for receiving a stylus 420 (i.e., an accessory device). In this example, holder 410 is positioned on engagement section 55 along side 50c; however, other storage locations are possible in other examples (e.g., such as within pocket 54).

Further, while not specifically shown in FIG. 10, additional electronics may be included within the receptacle 450 to interact with electronics within stylus 420 in the same or similar manner as that described above for keyboard 70 within receptacle 50. For example, holder 410 may include a sensor (not shown) similar to (or the same as) sensor 62 (see FIG. 4) for sensing the presence of stylus 420 within holder 410 (e.g., the sensor may sense the magnetic field generated by a magnet within stylus 420). Upon sensing the presence of the stylus 420 within holder 410, the same routines described above in method 100 of FIG. 7 may be performed with respect to the stylus 420 (either in addition to, or in lieu of, the routines for keyboard 70).

Referring now to FIG. 11, an electronic device 500 is shown that includes computing device 20 and a receptacle 550. Computing device 20 is the same as described herein for the example of FIGS. 1-6, and thus, the previous description of this component applies to the example of FIG. 11. In addition, receptacle 550 is generally the same as receptacle 50 described herein for the example of FIGS. 1-6; however, receptacle 550 is to receive a mouse 570 rather than a keyboard 70. As a result, the size and shape of receptacle 550 is altered from receptacle 50 to accommodate mouse 570 in place of keyboard 70 (see FIG. 6). In particular, receptacle 550 includes a receptacle wall 520 and an engagement section 555. Wall 520 and engagement section 555 are generally the same as receptacle wall 52 and engagement section 55 on receptacle 50, except that wall 520 is sized to receive a mouse 570 therein. Further, the receptacle 550 may include the same (or similar) electronics as were included within receptacle 50 for communicating with electronics within computing device 20 and interacting with electronics within mouse 570. For example, receptacle 550 may include sensor 62 (not shown see FIG. 4) that senses the presence of mouse 570 within receptacle 550 in the same manner described above for keyboard 70 and receptacle 50. Upon sensing the presence of the mouse 570 within receptacle 550, the same routines described above in method 100 of FIG. 7 may be performed with respect to mouse 570.

Accordingly, as described above for the example of FIGS. 1-6, in the examples of FIGS. 8-11, an electronic device (e.g., electronic devices 200, 300, 400, 500) includes a computing device (e.g., computing devices 20, 220, 320) and a receptacle (e.g., receptacle 50, 450, 550) disposed on the computing device that allows a user to simply place an accessory device (e.g., keyboard 70, stylus 420, mouse 570) within the receptacle to trigger or initiate a number of different conditioning and connection routines that enhance and support the use of the accessory device with the computing device. Thus, a user's experience is greatly simplified with respect to the storage and use of the accessory device with the computing device.

The above discussion is meant to be illustrative of the principles and various examples of the present disclosure. Numerous variations and modifications will become apparent to those skilled in the art once the above disclosure is fully appreciated. It is intended that the following claims be interpreted to embrace all such variations and modifications.

What is claimed is:

1. An electronic device, comprising:
   a computing device comprising a display and a housing, wherein the housing comprises a front side and a back side, wherein the display is disposed on the front side;
   a receptacle disposed on the back side of the housing, wherein the receptacle is to receive an accessory device, wherein the accessory device comprises a keyboard with a first end, a second end opposite the first end, a first magnet disposed more proximate to the first end than the second end, and a second magnet disposed more proximate to the second end than the first end; and
   a magnetic sensor in the receptacle to communicate with the computing device, the magnetic sensor to sense the presence of the accessory device within the receptacle, wherein, in response to the magnetic sensor sensing the presence of the accessory device within the receptacle, the computing device is to change a power state of the accessory device.

2. The electronic device of claim 1, wherein, in response to the magnetic sensor sensing the presence of the accessory device within the receptacle, the computing device is to download machine readable instructions relating to the accessory device.

3. The electronic device of claim 1, wherein the computing device is transitionable between an open position and a closed position,
   wherein when the computing device is in the closed position, the front side and the display are hidden by the housing, and
   wherein when the computing device is in the open position, the front side and the display are exposed.

4. The electronic device of claim 3, wherein the computing device comprises a foldable display.

5. The electronic device of claim 1, wherein the receptacle further comprises a charging coil that is electrically coupled to the computing device, and wherein, in response to the magnetic sensor sensing the presence of the accessory device within the receptacle, the computing device is to induce an electrical current in the charging coil to charge a battery of the accessory device.

6. The electronic device of claim 5, wherein the receptacle includes a first connector that is to engage with a second connector on the computing device when the receptacle is disposed on the computing device, and wherein the sensor and the charging coil are to be coupled to the computing device via the engaged first connector and second connector.

7. An electronic device, comprising:
a computing device comprising a display and a housing, wherein the housing comprises a front side and a back side, wherein the display is disposed on the front side;
a receptacle to be removably disposed on the back side of the housing, wherein the receptacle is to receive an accessory device; and
a sensor in the receptacle to communicate with the computing device, the sensor to sense the presence of the accessory device within the receptacle, wherein the sensor comprises a magnetic sensor, and wherein the accessory device comprises a keyboard with a first end, a second end opposite the first end, a first magnet disposed more proximate to the first end than the second end, and a second magnet disposed more proximate to the second end than the first end,
wherein the sensor is to sense a magnetic field generated by the first magnet or the second magnet when the keyboard is disposed within the receptacle,
wherein, in response to the sensor sensing the presence of the accessory device within the receptacle, the computing device is to prompt the accessory device to power off.

8. The electronic device of claim 7, wherein, in response to the sensor sensing the presence of the accessory device within the receptacle, the computing device is to download machine readable instructions relating to the accessory device.

9. The electronic device of claim 8, wherein the machine readable instructions comprises driver machine readable instructions for the accessory device.

10. The electronic device of claim 7, wherein the receptacle further comprises a charging coil that is electrically coupled to the computing device, and wherein, in response to the sensor sensing the presence of the keyboard within the receptacle, the computing device is to induce an electrical current in the charging coil to charge a battery of the keyboard.

11. An electronic device, comprising:
a computing device comprising a display and a housing, wherein the housing comprises a front side and a back side, wherein the display is disposed on the front side;
a receptacle to be removably disposed on the back side of the housing, wherein the receptacle is to receive a keyboard with a first end, a second end opposite the first end, a first magnet disposed more proximate to the first end than the second end, and a second magnet disposed more proximate to the second end than the first end; and
a magnetic sensor in the receptacle to communicate with the computing device, the magnetic sensor to sense a magnetic field generated by the first magnet or the second magnet in the keyboard to sense the presence of the keyboard within the receptacle,
wherein, in response to the magnetic sensor sensing the presence of the keyboard within the receptacle, the computing device is to prompt the keyboard to power off and to download machine readable instructions relating to the keyboard.

12. The electronic device of claim 11, wherein the receptacle further comprises a charging coil that is coupled to the computing device, and wherein, in response to the magnetic sensor sensing the presence of the keyboard within the receptacle, the computing device is to induce an electrical current in the charging coil to charge a battery of the keyboard.

* * * * *